INVENTORS
ANDRÉ ALIN LUDOVIC CHANEAC
HENRI GASTON CHANEAC

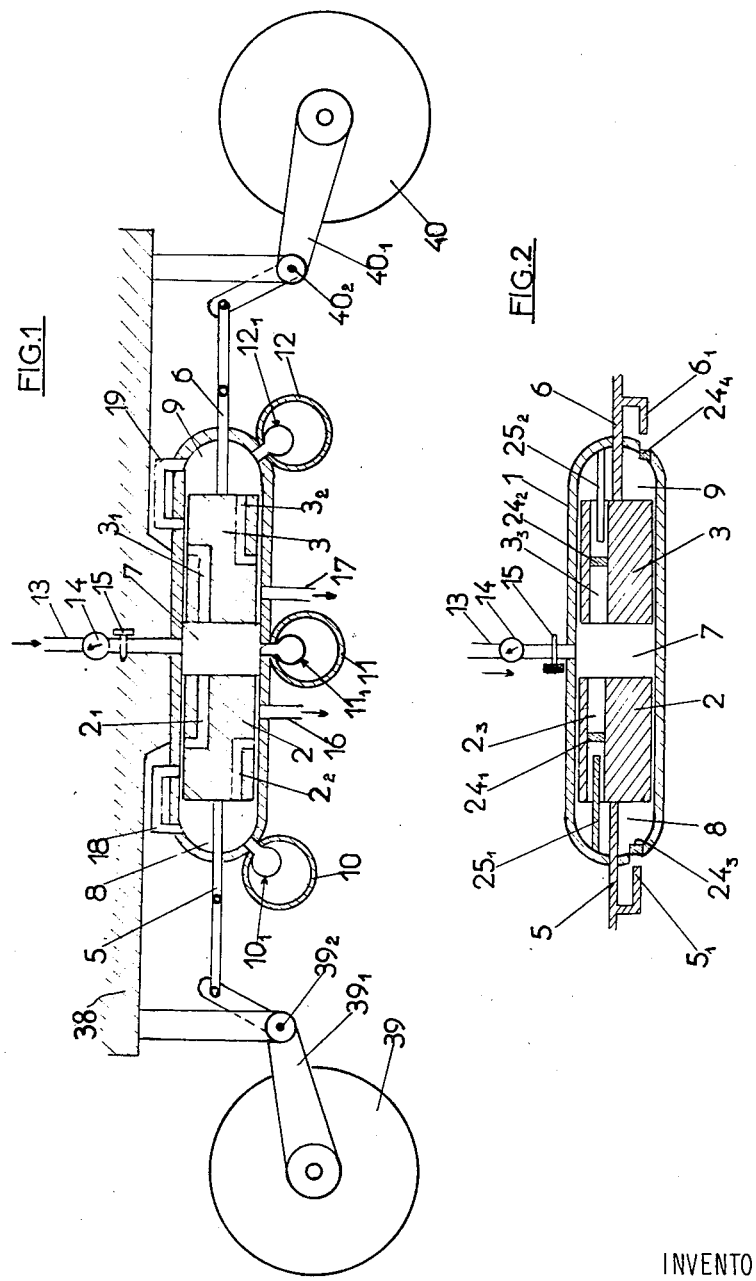

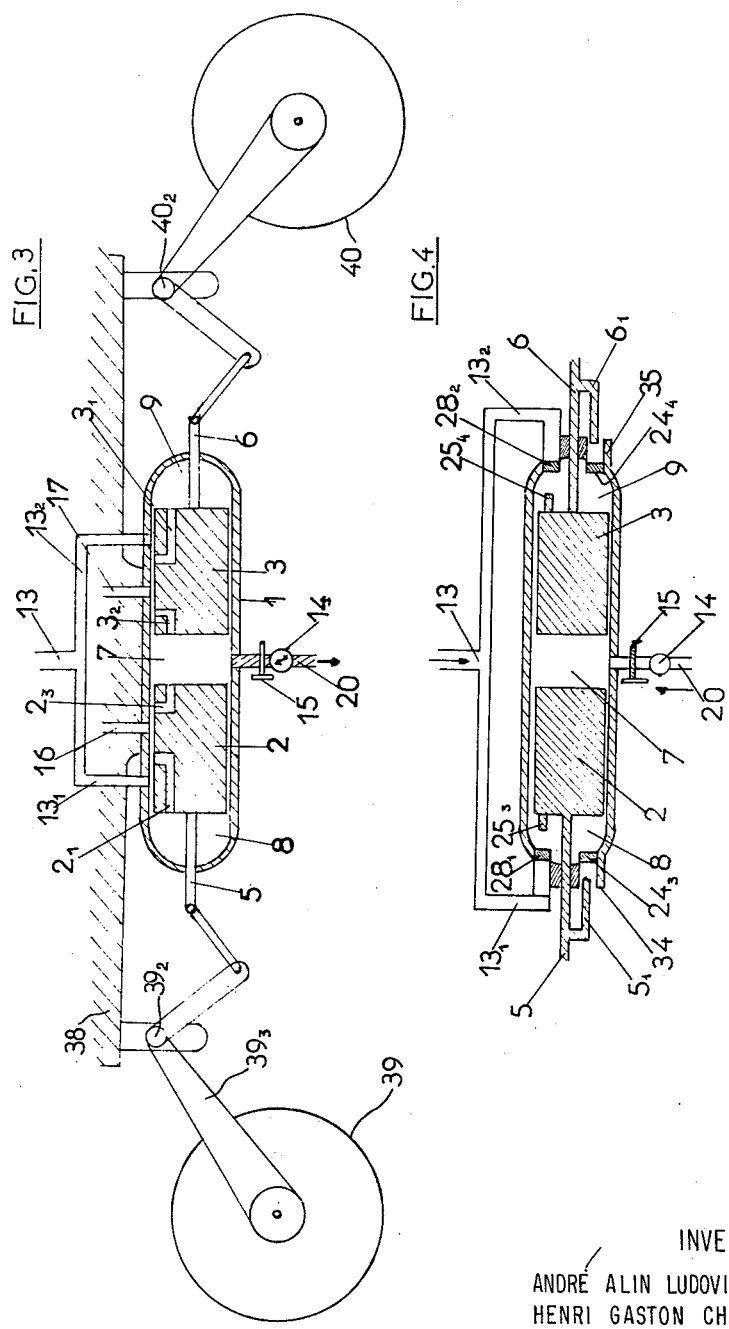

BY *Jennings and Smiley*

ATTORNEYS

United States Patent Office 3,203,708
Patented Aug. 31, 1965

3,203,708
INTERACTING FLUID SUSPENSION AND VEHICLES FITTED WITH THESE SUSPENSIONS
André Alin Ludovic Chaneac, Cours du Palais, Privas, France, and Henri Gaston Chaneac, 127 Boulevard, Saint Michel, Paris, France
Filed Mar. 8, 1962, Ser. No. 178,465
Claims priority, application France, Mar. 10, 1961, 855,246, Patent 1,291,031
4 Claims. (Cl. 280—124)

One of the objects of this invention is to produce an interacting fluid suspension in which the pressure differences on the two faces of the pistons can balance the load of each wheel of the vehicle.

Another object of the invention is to produce an interacting fluid suspension in which, by modifying the difference in pressures on the faces of the pistons, they are kept in or automatically brought back to an equilibrium position.

Another object of the invention is to produce a suspension working either under compression or by traction.

Another object of the invention is to produce a suspension having an adjustable flexibility.

Another object of the invention is, by means of this suspension, to lock the body or chassis of the vehicle in the high position, more particularly for repairing a given wheel of the vehicle.

Other objects and advantages will be revealed by the following description and the attached drawings. The characteristics of the invention arising out of the claims attached to the end of the description:

FIGURE 1 shows a diagrammatical section a gas and liquid suspension working under compression and incorporated into a vehicle.

FIGURE 2 is another example of embodiment of a pneumatic suspension working under compression.

FIGURES 3, 4, 5 and 6 show example embodiments of a pneumatic suspension working under traction.

Figure 5:
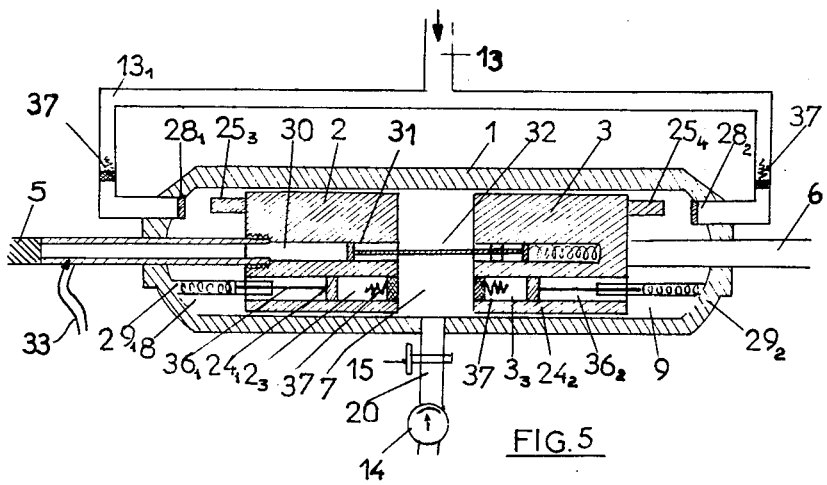

The suspensions shown in FIGURES 1 and 2 are suspensions working under compression.

The suspension shown in FIGURE 1 consists of a cylinder 1 which is integral with a vehicle 38 and which is arranged between two of the wheels 39 and 40 of this vehicle, either between the two front wheels, between the two rear wheels, or between the front and rear wheels, these two latter wheels being on the same side, or not, of the vehicle.

Inside this cylinder 1 there are two pistons 2 and 3 each connected to one of the wheels 39 and 40 of the vehicle by a rod or small connecting rod 5 and 6 pivoted to one end of a bellcrank 39, or 40, in turn pivoted to the vehicle at $39_2$ or $40_2$.

These two pistons 2 and 3 thus divide the cylinder 1 into three compression chambers, of which one, 7, is the central compression chamber, and the two others 8 and 9 the lateral compression chambers.

It can be noticed in FIG. 1 that the suspension works under compression as raising the wheels of the vehicle causes pistons 2 and 3 to come closer in order to compress the fluid contained in central chamber 7. In order to obtain a suspension working under traction, the angle of the bell crank may be reversed so as to exert a pull on rods 5 and 6 as shown in FIG. 3.

This suspension shown in FIGURE 1 is a gas and liquid suspension (for example, an oleopneumatic suspension) and to this end, comprises three chambers 10, 11, 12 which are screwed on to the cylinder 1 respectively communicating with the chambers 7, 8 and 9.

In these fluid-tight chambers 10, 11 and 12 these are flexible diaphragms $10_1$, $11_1$ and $12_1$ which separate the liquid contained in the chambers 8, 7 and 9 from the gas contained in the chambers 10, 11 and 12.

A pipe 13 emerges into the central compression chamber 7 acting for bringing in fluid under pressure.

A hand-release 14 is arranged in this pipe 13 enabling the flexibility of the suspension to be varied.

An evacuation cock or valve 15 is associated with this hand-release 14 which enables the vehicle to be locked in the high position and thus raise one of the wheels of the vehicle from the ground, in order to carry out some kind of repair. The petcock is operable to raise one or more wheels in the following manner.

The petcock 15 is a conventional two-way valve, which is always open under normal operating condition and which, when it is set to the other position, connects the central compression chamber with the atmosphere by closing the pressurized fluid supply conduit 13 after the manually operable release valve 14.

While the vehicle is stationary the vehicle operator sets the release valve in the maximum pressure position which causes the vehicle to raise with respect to the wheels which remain in contact with the ground. While the vehicle chassis thus remains in the "high" position, the operator places one or several spacing blocks between the ground and the chassis in the vicinity of the wheel (or wheels) which is to be repaired; then the operator actuates petcock 15 to place it in its second position which causes the evacuation of fluid from the central chamber and forces the wheel to come closer to the chassis of the vehicle.

The wheel, at the location where the chassis has been placed on spacing blocks, will move away from the ground, thus making repair of the wheel possible.

As far as the other wheels are concerned the chassis will tilt in the direction of the ground since there are no spacing blocks in the vicinity of said wheels.

It can easily be understood that the same process can be used to also raise two wheels on one side of the vehicle or all four wheels.

In each of the pistons 2 and 3 there are two ports $2_1$–$2_2$ and $3_1$–$3_2$ which enable the compression chambers to communicate with each other or with the evacuation pipes 16 and 17, in order to vary the pressure in the compression chambers 7, 8 and 9. Two ducts 18 and 19 are provided for this purpose on the cylinder 1 and enable, for a certain position, the connecting of the pistons 2 and 3, the connecting of the central chamber 7 to the chambers 8 and 9 by means of the ports $2_1$ and $3_1$.

Ports $2_2$ and $3_2$ respectively made in the pistons 2 and 3 enable the compression lateral chambers 8 and 9 to communicate with the evacuation pipes 16 and 17 when the pistons 2 and 3 draw near to each other.

When the engine of the vehicle is stopped the pump driven by said engine does not supply any fluid under pressure to the cylinder; the pistons of the suspension working under compression are therefore brought in contact with each other.

When the engine of the vehicle is started it drives the pump which supplies fluid under pressure to the suspension, the pressure in central chamber 7 supplied by conduits 13 increases with the effect of pushing pistons 2 and 3 back toward the ends of cylinder 1.

As soon as the vehicle starts to run uneven surfaces on the road impart to the pistons 2 and 3 to-and-fro movements which have the effect, according to the displacement direction of this piston, either to send a little of the fluid from the central chamber 7 into the lateral chambers 8 and 9, through the ducts 18 and 19, or to evacuate the fluid contained in the lateral chambers 8 and 9 towards the evacuation pipes 16 and 17 through the ports $2_2$ and $3_2$.

The pistons are thus automatically returned to their mean equilibrium position.

Thus, when the two pistons 2 and 3 separate from each other under the effect of a jolt from the road, the central compression chamber 7 is put into communication with the lateral chambers 8 and 9 through the ports $2_1$ and $3_1$ and the ducts 18 and 19; on the other hand, when the two pistons 2 and 3 come together the ports $2_2$ and $3_2$ put the lateral compression chambers 8 and 9 into communication with the evacuation pipes 17 and 16.

The adjustable flexibility of the suspension may be exemplified as follows:

Assuming for instance that it is necessary to have a pressure difference of 10 kg./cm.$^2$ on both end faces of piston 2 (FIG. 1) and a pressure difference of 5 kg./cm.$^2$ on both end faces of piston 3 in order to balance the load of the vehicle, these pressure differences of 10 and 5 kg./cm.$^2$ can be obtained if the pressures in the compression chambers are adjustable to the following values.

|  | Kg./cm.$^2$ |
|---|---|
| Central chamber 7 | 15 |
| Lateral chamber 8 | 5 |
| Lateral chamber 9 | 10 |

But such conditions of equilibrium will also be reached with the following pressures.

|  | Kg./cm.$^2$ |
|---|---|
| Central chamber 7 | 30 |
| Lateral chamber 8 | 20 |
| Lateral chamber 9 | 25 |

In both of the above two examples it can be seen that the absolute value of the pressure in each of the compression chambers may vary but that the pressure difference between sides of each piston remains constant so as to maintain the condition of equilibrium.

The only difference existing between these two sets of conditions is that the first suspension is softer than the second one.

The suspension shown in FIGURE 2 comprises only one fluid inlet under pressure 13 emerging in the central chamber 7 and two evacuation pipes, not shown but corresponding to pipes 16 and 17 which emerge in the lateral compression chambers 8 and 9.

In this suspension, the communication between the central chamber 7 and two lateral chambers 8 and 9 takes place by the intermediary of flap-valves $24_1$ and $24_2$ placed in the pipes $2_3$ and $3_3$ made in pistons 2 and 3.

These flap-valves $24_1$ and $24_2$ are controlled by fingers $25_1$ and $25_2$ fixed either on the cylinder or the flap-valve.

The evacuation pipes 16 and 17 are also closed by flap-valves or valves $24_3$ and $24_4$ which are controlled by fingers $5_1$ and $6_1$ integral either with the pistons 2 and 3, or rods 5 and 6 connecting the pistons 2 and 3 to the wheels of the vehicle, or by a trim corrector linked up to the suspension of the vehicle.

The working of this suspension is identical with that shown in FIGURE 1, the modification of pressure in each of the chambers taking place by means of flap-valves instead of ports.

Consequently, in the suspension working under compression shown in FIGURES 1 and 2, the pressure in the central chamber or chambers 7 is greater than the pressure in the lateral chambers 8 and 9.

On the other hand, in the suspension working under traction shown in FIGURES 3, 4, 5 and 6 the pressure of the lateral chambers 8 and 9 is greater than the pressure in the chamber 7.

The suspension shown in FIGURE 3 is a pneumatic suspension working under traction.

In this suspension, the cylinder comprises two main inlets for fluid under pressure $13_1$ and $13_2$ which supply the lateral chambers 8 and 9 through the ports $2_1$ and $3_1$.

A secondary pipe 20 for the inlet of fluid under pressure is also fixed on the cylinder 1 and emerges in the central chamber 7, by means of a pressure-release 14 and a petcock 15.

Two evacuation pipes 16 and 17 are also fixed on the cylinder 1 so as to be able, either to correspond with the ports $2_1$ and $3_1$ so as to reduce the pressure in the lateral chambers, or to correspond with the ports $2_2$ and $3_2$, so as to evacuate the fluid from the central chamber 7.

Thus, in this suspension, the ports $2_2$ and $3_2$ of the pistons 2 and 3 come opposite to the evacuation pipes 16 and 17, and the ports $2_1$ and $3_1$ of the pistons 2 and 3 come opposite to the inlet pipes for the fluid under pressure $13_1$ and $13_2$; or opposite to the evacuation pipes 16 and 17. The bellcranks $39_3$ and $40_3$ connecting the unit to the wheels have their angles reversed from those shown in FIG. 1 thus placing the suspension unit in traction.

The suspension shown in FIGURE 4 is another form of embodiment. In this embodiment the ports of the pistons 2 and 3 are eliminated and the pipes $13_1$ and $13_2$ for the inlet of fluid under pressure as well as the pipes 34 and 35 are closed by flap-valves or valves $28_1$, $28_2$, and $24_3$, $24_4$, these various flap-valves being controlled either by fingers $25_3$ and $25_4$ which are integral with the pistons 2 and 3, or by the fingers $5_1$ and $6_1$ integral with the small connecting rods 5 and 6.

A secondary pressure inlet 20 emerges in the central chamber 7 through the pressure-release 14 and the petcock 15.

The working of this suspension is identical with the preceding cases, the pistons 2 and 3 being automatically returned to a mean equilibrium position.

In the suspension shown in FIGURE 5, the two pistons 2 and 3 comprise two ports $2_3$ and $3_3$ which cause the chambers 8 and 9 to communicate with the central chamber 7 by means of flap-valves $24_1$ and $24_2$ controlled by the rods $36_1$ and $36_2$ integral with these flap-valves. These rods pass through a hollow tube $29_1$ and $29_2$ integral with the cylinder 1, and terminate in pistons which enables the flap-valves $24_1$ and $24_2$ to be opened when the pistons 2 and 3 come together. The piston 2 comprises a second port 30 closed by the flap-valve 31 whose opening is controlled by the rod 32 which engages in the piston 3 and terminates in a piston, thus enabling the flap-valve 31 to open when the pistons 2 and 3 separate from each other. The port 30 enables the chamber 7 to communicate with the exterior by the rod 5 connecting the piston 2 to a wheel of the vehicle, to this end this rod is hollow on part of its length and the evacuation of the chamber 7 takes place by a flexible tube 33. A secondary pressure pipe 20 emerges in the central chamber 7 by means of the pressure-release 14 and the petcock 15.

The working of this suspension is identical with the preceding cases, the pistons 2 and 3 being automatically returned to the mean equilibrium position. Non-return flap-valves 37 may be placed in the various passage pipes to prevent an inversion in the passage direction of the fluid.

Figure 6:
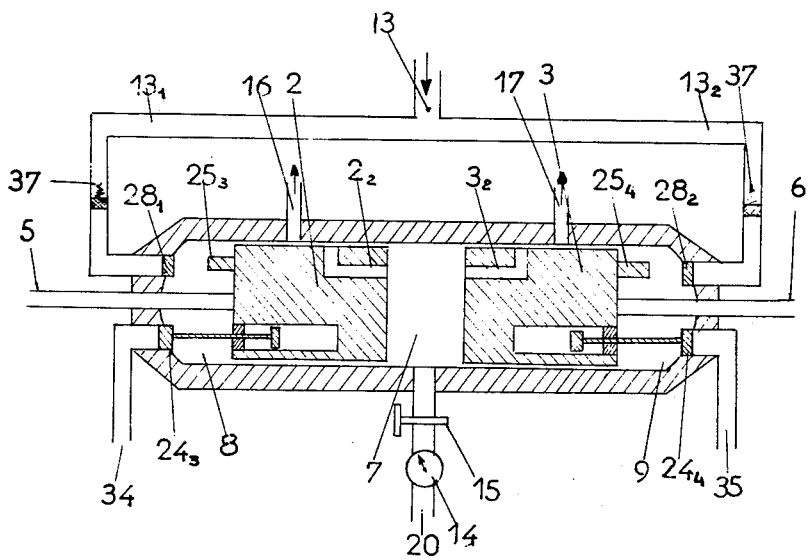

In the suspension shown in FIGURE 6, we find the same elements of FIGURE 4, the flap-valves $24_3$ and $24_4$ being controlled by the pistons 2 and 3. Moreover, these pistons 2 and 3 comprise two ports $2_2$ and $3_2$ which, as in FIGURE 3, cause the central chamber 7 to communicate with the evacuation pipes 16 and 17.

The working of this suspension is identical with the preceding cases.

Obviously, the invention is not limited to the examples of embodiment described and shown above; if necessary, recourse may be had to other methods and forms of embodiment without going outside of the scope of the invention for that purpose. In particular, the fluid suspensions can be produced immaterially either with a single fluid (pneumatic) or with two fluids (hydro-oleopneumatic) and, to this end, comprise flexible diaphragms separating the two fluids in the compression chambers.

The invention applies not only to suspensions but also to vehicles fitted with these suspensions.

It will also be noticed that damping devices can be placed in the inlet or evacuation pipes for fluid, particularly in oleo or hydropneumatic suspensions.

What we claim is:

1. Interacting fluid suspension of adjustable flexibility for a wheeled vehicle, comprising a cylinder fixed to a vehicle chassis, two pistons dividing said cylinder into two lateral fluid compression chambers and a central fluid compression chamber, two rods passing through the two ends of the cylinder and connecting each piston to a wheel of the vehicle so as to balance its load by fluid pressure difference on both end faces of the corresponding piston, a pressure fluid inlet conduit communicating with the central chamber, a pair of fluid inlet conduits connected in the lateral compression chambers, means for opening and closing said pair of fluid inlet conduits controlled by the positions of the pistons in the cylinder, fluid outlet conduits in the lateral compression chambers, means for opening and closing of said outlet conduits controlled by the positions of the pistons, each of said pistons being automatically returned to a median position of equilibrium during vehicle movement to retain a substantially equal difference of pressure on its end faces by opening and closing of said pair of fluid inlet and said outlet conduits caused by wheel engendered movements of the pistons, and a valve actuable by a vehicle operator and located in the pressure fluid inlet conduit of the central chamber allowing manual variation of the fluid pressure in the central chamber followed by a similar pressure variation in the lateral fluid compression chambers which returns the pistons to their median positions of equilibrium, whereby to obtain a variation of flexibility of the suspension.

2. A fluid suspension according to claim 1 wherein said pair of fluid inlet conduits connect the lateral compression chambers with the central compression chamber.

3. A fluid suspension according to claim 1 wherein said pair of fluid inlet conduits in the lateral compression chambers are connected to a source of pressure fluid separate from that connected to said pressure fluid inlet conduit.

4. A fluid suspension according to claim 1 wherein a petcock is located in said pressure fluid inlet conduit for outlet of fluid from said central chamber, whereby to permit raising at least one of the vehicle wheels relative to the ground.

References Cited by the Examiner

UNITED STATES PATENTS

| 820,707 | 5/06 | Downer. |
|---|---|---|
| 1,036,340 | 8/12 | Rockwell. |
| 2,756,046 | 7/56 | Lucien. |

FOREIGN PATENTS

| 447,445 | 7/27 | Germany. |
|---|---|---|
| 5,969 | 1906 | Great Britain. |

A. HARRY LEVY, *Primary Examiner.*

PHILIP ARNOLD, LEO FRIAGLIA, *Examiners.*